(12) United States Patent
Ignomirello (10) Patent No.: US 9,584,312 B2
(45) Date of Patent: *Feb. 28, 2017

(54) METHODS AND SYSTEMS FOR STORING AND RETRIEVING DATA

(71) Applicant: SYMBOLIC IO CORPORATION, Holmdel, NJ (US)

(72) Inventor: Brian Ignomirello, Holmdel, NJ (US)

(73) Assignee: SYMBOLIC IO CORPORATION, Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,331

(22) Filed: Oct. 5, 2016

(65) Prior Publication Data

US 2017/0026172 A1 Jan. 26, 2017

Related U.S. Application Data

(63) Continuation of application No. 13/908,239, filed on Jun. 3, 2013, now Pat. No. 9,467,294, which is a continuation-in-part of application No. 13/797,093, filed on Mar. 12, 2013, and a continuation-in-part of application No. 13/756,921, filed on Feb. 1, 2013.

(51) Int. Cl.
| | | |
|---|---|---|
| *G06F 12/14* | (2006.01) | |
| *G06F 11/30* | (2006.01) | |
| *H04L 9/06* | (2006.01) | |
| *G06F 17/30* | (2006.01) | |
| *G06F 21/62* | (2013.01) | |
| *H03M 7/30* | (2006.01) | |
| *H03M 7/40* | (2006.01) | |
| *G06F 11/14* | (2006.01) | |

(52) U.S. Cl.
CPC ...... *H04L 9/0643* (2013.01); *G06F 17/30949* (2013.01); *G06F 21/6218* (2013.01); *H03M 7/3093* (2013.01); *H03M 7/40* (2013.01); *G06F 11/1453* (2013.01); *H04L 2209/34* (2013.01)

(58) Field of Classification Search
CPC ............... H04L 9/0643; H04L 2209/34; G06F 17/30949; G06F 21/6218; G06F 11/1453; H03M 7/3093; H03M 7/40
USPC ....................................................... 713/193
See application file for complete search history.

(56) References Cited

U.S. PATENT DOCUMENTS

| | | |
|---|---|---|
| 3,016,527 A | 1/1962 | Gilbert et al. |
| 4,183,464 A | 1/1980 | Babb |
| 4,286,256 A | 8/1981 | Langdon et al. |
| 4,635,141 A | 1/1987 | Coulter |
| 5,300,930 A | 4/1994 | Burger |
| 5,818,877 A | 10/1998 | Tsai et al. |

(Continued)

FOREIGN PATENT DOCUMENTS

WO   2006/042019   4/2006

OTHER PUBLICATIONS

Sage A. Weil; CRUSH: Controlled, Scalable, Decentralized Placement of Replicated Data; IEEE-2006; p. 1-12.*

(Continued)

*Primary Examiner* — Monjour Rahim
(74) *Attorney, Agent, or Firm* — Maldjian Law Group LLC (57) ABSTRACT

Through use of the technologies of the present invention, one is able to store and to retrieve data efficiently. One may realize these efficiencies by coding the data and storing coded data that is of a smaller size than original data.

13 Claims, 4 Drawing Sheets

(56) References Cited

U.S. PATENT DOCUMENTS

| | | | |
|---|---|---|---|
| 5,872,530 A * | 2/1999 | Domyo | H03M 7/3088 341/106 |
| 6,052,785 A | 4/2000 | Lin | |
| 6,297,753 B1 | 10/2001 | Hayami | |
| 6,310,564 B1 | 10/2001 | Fujimoto | |
| 6,465,969 B1 | 10/2002 | Murasko et al. | |
| 6,560,599 B1 | 5/2003 | Boa et al. | |
| 6,785,815 B1 * | 8/2004 | Serret-Avila | G06T 1/0071 348/E7.06 |
| 6,829,695 B1 | 12/2004 | Ross | |
| 7,290,116 B1 | 10/2007 | Grohoski et al. | |
| 7,363,331 B2 * | 4/2008 | Karasudani | G06F 11/004 707/737 |
| 7,587,408 B2 | 9/2009 | Snapp et al. | |
| 7,921,088 B1 | 4/2011 | Mittal | |
| 7,930,473 B2 | 4/2011 | Rajan | |
| 3,009,069 A1 | 8/2011 | Chen et al. | |
| 8,009,069 B2 | 8/2011 | Chen et al. | |
| 8,117,028 B2 | 2/2012 | Murashima | |
| 8,164,490 B2 | 4/2012 | Itani | |
| 8,214,425 B2 | 7/2012 | Provencal | |
| 8,237,594 B2 | 8/2012 | Suzuki et al. | |
| 8,290,160 B1 * | 10/2012 | Steeger | G09C 1/00 358/426.04 |
| 2002/0172203 A1 * | 11/2002 | Ji | G06F 17/30955 370/392 |
| 2003/0115447 A1 | 6/2003 | Pham | |
| 2003/0122694 A1 | 7/2003 | Green | |
| 2004/0143733 A1 | 7/2004 | Ophir | |
| 2005/0198076 A1 | 9/2005 | Stata et al. | |
| 2006/0171050 A1 | 8/2006 | Hanson et al. | |
| 2006/0248273 A1 | 11/2006 | Jernigan et al. | |
| 2007/0101074 A1 | 5/2007 | Patterson | |
| 2007/0291934 A1 | 12/2007 | Volkovs et al. | |
| 2008/0062020 A1 | 3/2008 | Lakus-Becker | |
| 2008/0077586 A1 * | 3/2008 | Lam | G06F 17/30091 |
| 2008/0133835 A1 | 6/2008 | Zhu et al. | |
| 2009/0112880 A1 | 4/2009 | Oliveira et al. | |
| 2009/0129691 A1 | 5/2009 | Luttmer et al. | |
| 2009/0169001 A1 | 7/2009 | Tighe et al. | |
| 2009/0300301 A1 | 12/2009 | Vaghani | |
| 2010/0169287 A1 | 7/2010 | Klose | |
| 2010/0250501 A1 | 9/2010 | Mandagere et al. | |
| 2010/0306294 A1 * | 12/2010 | Schneider | H04L 9/0643 708/250 |
| 2011/0107112 A1 | 5/2011 | Resch | |
| 2011/0276771 A1 | 11/2011 | Tajima et al. | |
| 2012/0076298 A1 * | 3/2012 | Bolotov | H04L 9/0631 380/255 |
| 2012/0124282 A1 | 5/2012 | Frank et al. | |
| 2012/0131293 A1 | 5/2012 | Benhase et al. | |
| 2012/0159282 A1 | 6/2012 | Ito | |
| 2012/0166757 A1 * | 6/2012 | Volvovski | G06F 17/30 711/206 |
| 2012/0239860 A1 | 9/2012 | Atkisson et al. | |
| 2012/0278382 A1 | 11/2012 | Faith | |
| 2012/0330894 A1 | 12/2012 | Slik | |
| 2013/0013618 A1 | 1/2013 | Heller et al. | |
| 2014/0082324 A1 * | 3/2014 | Elhamias | G06F 12/0862 711/213 |
| 2014/0223118 A1 * | 8/2014 | Ignomirello | G06F 12/16 711/161 |
| 2014/0279911 A1 | 9/2014 | Ignomirello | |

OTHER PUBLICATIONS

International Preliminary Report on Patentability mailed Aug. 13, 2015 in connection with International Application No. PCT/US2014/014209, 8 pages.

International Preliminary Report on Patentability mailed Aug. 13, 2015 in connection with International Application No. PCT/US2014/014225, 7 pages.

International Search Report and Written Opinion mailed Aug. 20, 2014 issued in connection with International Application No. PCT/US2014/014209, 5 pages.

International Search Report and Written Opinion mailed Jan. 16, 2015 issued in connection with International Application No. PCT/US2014/014225, 2 pages.

Lillibridge, M., Eshghi, K, Bhagwat, D., Deolalikar, V., Trezise, G., and Camble, P. 2009. Sparse Indexing: Large Scale, inline deduplication using sampling and locality. In Proceedings of the 7th USNIX Conference on File and Storage Technologies (FAST), USENIX Association, Berkeley, CA, 111-123, 13 pages.

Tate, Jon, et al., Real-time Compression in SAN Volume Controller and the Storwize V 7000, IBM (Aug. 17, 2012), 364 pages.

Makatos, Thano, et al., ZBD: Using Transparent Compression at the Block Level to Increase Storage Space Efficiency, IEEE Computer Society pp. 61-70 (2010), 10 pages.

Seagate, SCSI Commands Reference Manual (Feb. 14, 2006), 362 pages.

Sun Microsystems, Best Practices for Sun StorEdge 6920 System (Nov. 2004), 56 pages.

* cited by examiner

METHODS AND SYSTEMS FOR STORING AND RETRIEVING DATA

CROSS-REFERENCE TO RELATED APPLICATIONS

This application is a continuation of U.S. patent application Ser. No. 13/908,239, filed Jun. 3, 2013, entitled, "Methods and Systems for Storing and Retrieving Data", now U.S. Pat. No. 9,467,294, issued Oct. 11, 2016 which is a continuation-in-part of U.S. Ser. No. 13/756,921, which was filed on Feb. 1, 2013 and is also a continuation-in-part of U.S. Ser. No. 13/797,093, which was filed on Mar. 12, 2013. The entire disclosure of each of the afore-referenced priority applications is incorporated by reference into the instant specification.

FIELD OF THE INVENTION

The present invention relates to the field of data storage and retrieval.

BACKGROUND OF THE INVENTION

The twenty-first century has witnessed an exponential growth in the amount of digitized information that people and companies generate and store. This information is composed of electronic data that is typically stored on magnetic surfaces such as disks, which contain small regions that are sub-micrometer in size and are capable of storing individual binary pieces of information.

Because of the large amount of data that many entities generate, the data storage industry has turned to network-based storage systems. These types of storage systems may include at least one storage server that forms or is part of a processing system that is configured to store and to retrieve data on behalf of one or more entities. The data may be stored and retrieved as storage objects, such as blocks and/or files.

One system that is used for storage is a Network Attached Storage (NAS) system. In the context of NAS, a storage server operates on behalf of one or more clients to store and to manage file-level access to data. The files may be stored in a storage system that includes one or more arrays of mass storage devices, such as magnetic or optical disks or tapes. Additionally, this data storage scheme may employ Redundant Array of Independent Disks (RAID) technology.

Another system that is used for storage is a Storage Area Network (SAN). In a SAN system, typically a storage server provides clients with block-level access to stored data, rather than file-level access to it. However, some storage servers are capable of providing clients with both file-level access and block-level access.

Regardless of whether one uses NAS or SAN, all industries that generate data must consider the cost of storing and retrieving that data. Therefore, there is a need for new technologies for economically storing and retrieving data.

SUMMARY OF THE INVENTION

The present invention provides methods, systems and computer program products for improving the efficiency of storing and retrieving data. By using various embodiments of the present invention, one can efficiently store and access data that optionally has been converted or encoded for security. Because the present invention separates metadata from raw data, there is no limitation based on the type of file that can be stored and/or retrieved in connection with this invention. Additionally, through the various embodiments of the present invention one may transform data and/or change the physical devices on which the transformed or converted data is stored. This may be accomplished through automated processes that employ a computer that comprises or is operably coupled to a computer program product that when executed carries out one or more of the methods or processes of the present invention. These methods or processes may for example be embodied in or comprise a computer algorithm or script and optionally be carried out by a system.

According to a first embodiment, the present invention is directed to a method for storing data on a non-cache recording medium comprising: (i) receiving an I/O stream of N Bytes (using for example an I/O protocol); (ii) fragmenting the N Bytes into fragmented units of X Bytes; (iii) applying a cryptographic hash function (which is a value algorithm) to each fragmented unit of X Bytes to form a generated hash function value for each fragmented unit of X Bytes; (iv) accessing a correlation file, wherein the correlation file associates a stored hash function value of Y bits with each of a plurality of stored sequences of X Bytes and (a) if the generated hash function value for a fragmented unit of X Bytes is in the correlation file, using the stored hash function value of Y bits for storage on a non-cache recording medium; and (b) if the generated hash function value for the fragmented unit of X Bytes is not in the correlation file, then storing the generated hash function value of Y bits with the fragmented unit of X Bytes in the correlation file and using the generated hash function value for storage on the non-cache recording medium.

According to a second embodiment, the present invention is directed to a method for storing data on a non-cache recording medium comprising: (i) receiving an I/O stream of N Bytes; (ii) fragmenting the N Bytes into fragmented units of X Bytes; (iii) associating a cryptographic hash function value with each fragmented unit of X Bytes, wherein said associating comprises accessing a correlation file, wherein the correlation file associates a stored hash function value of Y bits with each of a plurality of stored sequences of X Bytes and (a) if the sequence of fragmented unit of X Bytes is in the correlation file, using the stored hash function value of Y bits for storage on a non-cache recording medium; and (b) if the sequence of fragmented unit of X Bytes is not in the correlation file, then storing a new generated hash function value of Y bits with the fragmented unit of X Bytes in the correlation file and using the new generated hash function value of Y bits for storage on the non-cache recording medium.

According to a third embodiment, the present invention is directed to a method for storing data on a non-cache recording medium comprising: (i) receiving an I/O stream of N Bytes; (ii) applying a cryptographic hash function to each unit of N Bytes to form a generated hash function value for each unit of N Bytes; (iii) accessing a correlation file, wherein the correlation file associates a stored hash function value of Y bits with each of a plurality of stored sequences of N Bytes and (a) if the generated hash function value for the unit of N Bytes is in the correlation file, using the stored hash function value of Y bits for storage on a non-cache recording medium; and (b) if the generated hash function value for the unit of N Bytes is not in the correlation file, then storing the generated hash function value of Y bits with the unit of N Bytes in the correlation file and using the generated hash function value for storage on the non-cache recording medium.

The various methods of the present invention may for example be used in connection with the following method for configuring storage systems to store electronic data: (i) receiving a set of parameters, wherein the parameters comprise one or more, if not all of file system information, bootability information and partition information; (ii) receiving metadata; and (iii) storing the parameters and metadata on a mediator. After configuration of the storage system, the system may be ready to receive one or more files, wherein each file has a file name; to store each of the files (optionally as processed through one of the aforementioned methods) on a non-cache medium at a location; and to store on the mediator, a correlation of each file name with a location on the non-cache medium.

When employing the various methods of the present invention, instructions may be stored on a computer program product that is encoded on a non-transitory computer-readable medium, operable to cause a data processing apparatus to perform operations comprising: (a) receiving, from a server, an I/O stream of N Bytes through an I/O protocol; (b) obtaining a hash function value for each unit of N Bytes or for a plurality of fragmented units of N Bytes; and (c) causing data to be stored that comprises either a plurality of hash values or a plurality of converted hash values. By converting the hash values into converted hash values, there may be heightened protection against unauthorized access to information within a stored file. Optionally, the computer program product further comprises a conflict resolution module that permits identification of the same hash function value being assigned to different units of N Bytes or different fragmented units of N Bytes, and causes different data to be stored that corresponds to each of the conflicting hash function values. The computer program products, when executed, can cause initiation and automatic execution of the aforementioned features. These instructions may be stored in one module or in a plurality of separate modules that are operably coupled to one another.

Various embodiments of the present invention may also be implemented on systems. An example of a system of the present invention comprises: (a) a non-cache storage medium (which may be a persistent or non-transitory storage device) and (b) one or more processors operable to interact with the non-cache storage medium. Optionally, the system further comprises one or more user interfaces (e.g., graphic use interfaces) that are capable of allowing a user to interact with the one or more processors. The one or more processors are further operable to carry out one or more of the methods of the present invention, which may for example be stored on a computer program product that is stored in a non-transitory medium.

In some embodiments, the system further comprises: (i) a mediator, wherein the mediator is stored remotely from the non-cache data storage medium, and the mediator comprises: (a) a first set of tracks; (b) a second set of tracks; (c) a third set of tracks; and (d) a fourth set of tracks; (ii) a non-cache medium; and (iii) a manager, wherein the manager is configured: (a) to cause storage of data comprising one or more of file system information, bootability information and partition information in the first set of tracks; (b) to cause storage of metadata in the third set of tracks; (c) to cause storage of one or more files on the non-cache medium, wherein the one or more files are stored on the non-cache medium without any of file system information, bootability information and partition information; (d) to cause storage in the fourth set of tracks of the location of each file in the non-cache medium; and (e) to cause storage of a correlation of the location of each file in the non-cache medium with a host name for a file.

Through the various embodiments of the present invention, one can increase the efficiency of storing and retrieving data. The increased efficiency may be realized by using less storage space than is used in commonly used methods and investing less time and effort in the activity of storing information. In some embodiments, one can also increase protection against unauthorized retrieval of data files. These benefits may be realized when storing data either remotely or locally, and the various embodiments of the present invention may be used in conjunction with or independent of RAID technologies.

DETAILED DESCRIPTION OF THE INVENTION

Reference will now be made in detail to various embodiments of the present invention, examples of which are illustrated in the accompanying figures. In the following detailed description, numerous specific details are set forth in order to provide a thorough understanding of the present invention. However, unless otherwise indicated or implicit from context, the details are intended to be examples and should not be deemed to limit the scope of the invention in any way.

DEFINITIONS

Unless otherwise stated or implicit from context the following terms and phrases have the meanings provided below.

The term "bit" refers to a binary digit. It can have one of two values, which can be represented by either 0 or 1. A bit is the smallest unit that is stored on a recording medium.

The term "block" refers to a sequence of bytes or bits of data having a predetermined length.

The phrases "bootability code," "bootability information" and "bootability feature" refer to information that provides the means by which to enter a bootable state and may be stored on a boot sector. A boot sector may contain machine code that is configured to be loaded into RAM (random access memory) by firmware, which in turn allows the boot process to load a program from or onto a storage device. By way of example, a master boot record may contain code that locates an active partition and invokes a volume boot record, which may contain code to load and to invoke an operating system or other standalone program.

The term "byte" refers to a sequence of eight bits.

The term "cache" refers to the location in which data is temporarily stored in order for future requests for the data to be served faster or for the purposes of buffering. The L1 cache (level 1 cache) refers to a static memory that is, for example, integrated with a processor core. The L1 cache may be used to improve data access speed in cases in which the CPU (central processing unit) accesses the same data multiple times. The L2 cache (level 2 cache) is typically larger than the L1 cache, and if a data file is sought but not found in a L1 cache, a search may be made of a L2 cache prior to looking to external memory. In some embodiments, the L1 cache is not within a central processing unit. Instead, it may be located within a DDR, DIMM or DRAM. Additionally or alternatively, L2 cache may be part of PCI2.0/3.0, which goes into a motherboard. Thus, each of L1 cache and L2 cache may be in separate parts of a motherboard. With respect to size, in some embodiments of the present invention L1 cache is between 2 gigabytes and 128 terabytes or between 2 gigabytes and 4 terabytes; and L2 cache is between 16 gigabytes and 1 petabyte or between 16 gigabytes and 3.2 terabytes.

The term "chunklet" refers to a set of bits that may correspond to a sector cluster. The size of a chunklet is determined by the storage system and may have a chunklet size. Traditionally, the chunklet size was derived by the CHS scheme, which addressed blocks by means of a tuple that defines the cylinder, head and sector at which they appeared on hard disks. More recently, the chunklet size has been derived from the LBA measurement, which refers to logical block addressing, and is another means for specifying the location of blocks of data that are stored on computer storage devices. By way of example, the chunklet size may be 512B, 1K, 2K, 4K, 8K, 16K, 32K, 64K or 1 MB. As persons of ordinary skill in the art are aware 1K=1024B. Chunklets may be received as raw data from a host.

The term "cubelet" refers to a virtual portion of capacity of a storage medium. Thus, it is a three dimensional space within what may be a non-cache medium. Within a cubelet, binary data that corresponds to a file or to part of a file may be stored, and from the cubelet this data may be retrieved. Thus, a cubelet is a virtual measurement and is analogous to a LUN (logic unit number).

A "file" is a collection of related bytes or bits having an arbitrary length. A file may be smaller than a chunklet, the same size as a chunklet or larger than a chunklet.

The phrase "file name" refers to a notation or code that permits a computer to identify a specific file and to distinguish that file from other files.

The phrase "file system" refers to an abstraction that is used to store, to retrieve and to update a set of files. Thus, the file system is the tool that is used to manage access to the data and the metadata of files, as well as the available space on the storage devices that contain the data. Some file systems may for example reside on a server. Examples of file systems include but are not limited to the Unix file system and its associated directory tables and Modes, Windows FAT16 and FAT32 file systems (FAT refers to File Allocation Table), Window NTFS, which is based on master file tables, and Apple Mac OSX, which uses HFS or HFS plus.

The phrases "hash function," "cryptographic hash function value algorithm" and "hash function value algorithm" refer to an algorithm or subroutine that maps large data sets (optionally of variable length) to smaller data sets that have a fixed length for a particular hash function. A "hash function value" refers to the output that is returned after application of a hash function algorithm. The values that the algorithm returns may also be called hash values, hash codes, hash sums, checksums or hashes. When, for example, using MD5, the output is 128 bits, whereas when using SHA-1, the output is 256 bits.

The terms "host" and "initiator" may be used interchangeably and refer to the entity or system that sends data for storage to the data storage and retrieval mediation system of the present invention. The host may send data that corresponds to one or more types of documents or files and received data. Preferably, within any input/output ("I/O") stream, the data corresponds to a file of a single document type.

The abbreviation "LBA" refer to logical block addressing. LBA is a linear addressing scheme and is a system that is used for specifying the location of blocks of data that are stored in certain storage media, e.g., hard disks. In a LBA scheme, blocks are located by integer numbers and only one number is used to address data. Typically, the first block is block 0.

The term "manager" refers to a computer program product, e.g., code that may be stored in a non-transitory medium and that causes one or more other actions to be taken, e.g., receiving, transmitting or processing data. It may be stored on hardware, software or a combination thereof. In some embodiments, the manager may be part of a computer and/or system that is configured to permit the manager to carry out its intended function.

The term "mediator" refers to a computer program product that may be stored on hardware, software or a combination thereof, and that correlates one or more units of storage space within at least one non-cache medium with a file name. A mediator may be orders of magnitude smaller than the non-cache medium to which it points. For example, it may be approximately as small as about 0.2% of the size of a typical cylinder. In some embodiments, the mediator may exist in a computing cloud, whereas in other embodiments, it exists in a non-transitory tangible recording medium. The mediator may be able to organize, to translate and to control the storage of data in locations that hosts perceive as being in certain tracks of recording media while actually occurring in different tracks of recording media or it may be operably coupled to a manager that serves one or more if not all of these functions. Furthermore, the mediator may comprise a sector map, a table or other organization of data that may be located within a physical device or structure, and thus the contents of the mediator may cause the physical device or structure to have certain geometry.

The term "metadata" refers to the administration information about containers of data. Examples of metadata include but are not limited to the length or byte count of files that are being read; information pertaining to the last time files were modified; information that describes file types and access permissions; and cubelet QoS, VM and WORM. Other types of metadata include operating system information, auto-initialization information, group permissions, and frequency of bits within the document type. In some embodiments, stored metadata may for example be used to permit efficient contraction or expansion of storage space for an initiator as the number and size of documents that it seeks to store shrinks or grows.

The abbreviation "NAS" refers to network area storage. In a NAS system, a disk array may be connected to a controller that gives access to a local area network transport.

The phrase "operably coupled" means that systems, devices and/or modules are configured to communicate with each other or one another and are able to carry out their intended purposes when in communication or after having communicated.

The phrase "operating system" refers to the software that manages computer hardware resources. Examples of operating systems include but are not limited to Microsoft Windows, Linux, and Mac OS X.

The term "partition" refers to formats that divide a storage medium, e.g., a disk drive into units. Thus, the partition may also be referred to as a disk partition. Examples of partitions include but are not limited to a GUID partition table and an Apple partition map.

The abbreviation "RAID" refers to a redundant array of independent disks. To the relevant server, this group of disks may look like a single volume. RAID technologies improve performance by pulling a single strip of data from multiple disks and are built on one or multiple premise types such as: (1) mirroring of data; (2) striping data, or (3) a combination of mirroring and striping of data.

The phrase "recording medium" refers to a non-transitory tangible computer readable storage medium in which one can store magnetic signals that correspond to bits. By way of example, a recording medium includes but is not limited to a non-cache medium such as hard disks and solid state drives. As persons of ordinary skill in the art know, solid state drives also have cache and do not need to spin. Examples of non-transitory tangible computer readable storage medium include, but are not limited to, a hard drive, a hard disk, a floppy disk, a computer tape, ROM, EEPROM, nonvolatile RAM, CD-ROM and a punch card.

The abbreviation "SAN" refers to a storage area network. This type of network can be used to link computing devices to disks, tape arrays and other recording media. Data may for example be transmitted over a SAN in the form of blocks.

The abbreviation "SAP" refers to a system assist processor, which is an I/O (input/output) engine that is used by operating systems.

The abbreviation "SCSI" refers to a small computer systems interface.

The term "sector" refers to a subdivision of a track on a disk, for example a magnetic disk. Each sector stores a fixed amount of data. Common sector sizes for disks are 512 bytes (512B), 2048 bytes (2048B), and 4096 bytes (4K). If a chunklet is 4K in size and each sector is 512B in size, then each chunklet corresponds to 8 sectors (4*1024/512=8). Sectors have tracks and are located on platters. Commonly, two or four platters make up a cylinder, and 255 cylinders make up hard disk and media devices.

The phrase "sector map" refers to the tool that receives calls from a host and correlates locations in a storage device where a file is stored. A sector map may, for example, operate under parameters that are defined by a SCSI protocol. In some embodiments of the present invention, the sector map may be located in a bit field of a mediator.

The term "track" refers to a circular unit within a disk that transverses all sectors. A "track sector" is a track within any one sector. A "track cluster" spans more than one sector.

Preferred Embodiments

The present invention provides methods for storing data on a non-cache recording media, computer program products for carrying out these methods, and systems that are configured to carry out these methods. Through various embodiments of the present invention, one can efficiently store and retrieve data.

According to one embodiment, the present invention provides a method in which a stream of N Bytes is received. The stream may be received over a network that is wired or wireless through known methods and technologies for transmitting I/O streams, and the stream may be sent by a host.

After receipt of the stream of data, in some embodiments the method calls for fragmenting the N Bytes into fragmented units of X Bytes. By fragmenting an I/O stream, the method divides each I/O stream into smaller units (which also may be referred to as blocks) of predetermined and preferably uniform size. As persons of ordinary skill in the art will recognize one benefit of using smaller block sizes is that small blocks allow for easier processing of data. By way of a non-limiting example, an I/O stream may be 4096 Bytes long, and the method may fragment that stream into fragmented units that are 1024, 512, 256 or 128 Bytes long.

Next a cryptographic hash function value algorithm may be applied to each fragmented unit of X Bytes to form a generated hash function value for each fragmented unit of X Bytes. Examples of hash function value algorithms include, but are not limited to, MD5 hash (also referred to as a message digest algorithm), MD4 hash and SHA-1. The value that is output from a hash function value algorithm may be referred to as a checksum or sum. In some examples, the sum is 64, 128 or 256 bits in size. Because of the highly repetitive nature of data within I/O streams, the probability of generating conflicting sums, i.e. sums that are the same but correspond to different fragmented units, is relatively low.

After a checksum is obtained for each fragmented unit, a correlation file is accessed. The method may obtain checksums according to a first in first out ("FIFO") protocol and either begins accessing the correlation file while the I/O streams are being received, while checksums are being generated, or after all I/O streams have been received, fragmented and subjected to the hash function value algorithm. The correlation file correlates a different stored hash function value of Y bits with each of a plurality of stored sequences of X Bytes and (a) if the generated hash function value for a fragmented unit of X Bytes is in the correlation file, the method causes the stored hash function value of Y bits to be used for storage on a non-cache recording medium; and (b) if the generated hash function value for the fragmented unit of X Bytes is not in the correlation file, the method causes the generated hash function value of Y bits to be stored with the fragmented sequence of X Bytes in the correlation file and uses the generated hash function value for storage on the non-cache recording medium. This hash function value, itself, may be stored or further processed prior to storage on the non-cache recording medium.

As noted above, the probability of conflicting hash values being generated as a result of application of the hash value algorithm is low. However, in various embodiments, the present invention also applies a conflict resolution module in order to address circumstances in which a conflict might arise. In these embodiments, there is a conflict module that is activated whenever for a fragmented unit of X Bytes, a hash value is generated that is the same as a hash value in a correlation file. This module then queries whether the fragmented unit of X Bytes is the same as the already stored value of X Bytes for that hash value. If the conflict resolution module determines that for a fragmented unit of X Bytes, a hash function value is generated that is the same as a stored hash function value in the correlation file, but the fragmented unit of X Bytes is different from the X Bytes associated with the stored hash function value, then the module causes there to be different Z bits associated with the stored hash function value and the generated hash function value.

In some embodiments, in the correlation file, for all hash function values for which no conflict exists, Z bits are associated and the Z bits are a uniform length of e.g., 8 to 16 zeroes. By way of a non-limiting example N=4096, X=512, Y=128 or 256, and Z=8 or 16. The method may associate 8 zeroes at the end of a checksum when the checksum does not conflict with a previously stored checksum. Upon identification of a conflict, (e.g., different fragmented units being associated with the same checksum,) the newest checksum may be assigned a different Z value. Thus, if the Z value as stored in the correlation file is 00000000, the Z value for the first conflicting checksum may be 00000001 and should there be another conflicting checksum 00000010. If there were additional conflicting checksums, each conflicting checksum may be assigned the next Z value as the conflicting checksum is identified. Thus, the conflict module may be accessed as a check after the correlation file is accessed, and only if the newly generated hash value is already within the correlation file. The conflict module would then determine if there is a conflict or if both the checksum and the fragmented units from the received file are already associated with each other in the correlation file.

Upon obtaining checksums for each fragmented unit, and following application of the conflict module if present, a plurality of hash function values may be stored on a non-cache recording medium.

In some embodiments, instead of storing the hash value, the method further comprises converting (also referred to as encoding) each hash function value for storage through use of a bit marker table to generate a bit marker for each hash function value for storage and storing each bit marker for the respective hash function value in the non-cache recording medium. By using a bit marker table, one may convert or code the hash values. Thus, the hash values may serve as input when accessing the bit marker table, and the bit markers may serve as output.

The methods of the present invention may, after obtaining the hash values that correspond to the fragmented units of the I/O stream execute an algorithm or computer program that is configured to translate the hash values into a set of coded data. This execution may for example be controlled by a manager that also controls the application of the hash function value algorithm. The coded data is also comprised of binary signals, and it is coded and stored in a manner that permits it to be converted back into the hash values of the file. Thus, information is retained during the encoding process that permits decoding without a loss of information.

In some embodiments, each hash value is assigned a code that consists of a plurality of 0s and/or 1s. In other embodiments, each hash value is divided into a plurality of subunits that are each assigned a code that consists of a plurality of 0s and 1s. The subunits may be defined by a length A, wherein the length of the hash value divided by A is an integer. If any subunit does not have that number of bits, e.g., one or more subunits have a smaller number of bits than the number within the subunits that are configured to be converted, the system may add bits, e.g., zeroes, until all subunits are the same size. Alternatively, it may be performed on the hash values level prior to dividing the hash values into subunits.

The encoding can serve two independent purposes. First, by converting the data for storage through the bit marker table, there is increased security. Only a person or entity that knows the code will be able to decode it and to reconstruct the document. Second, if the code is created using fewer bits than the hash values that correspond to the document, then both the use of converted data and the hash values will cause less storage space to be needed and there can be further cost savings.

In some embodiments, rather than using a bit marker table, the method further comprises encoding each hash function value for storage through use of a frequency converter. In these methods, for each hash function value for storage, a converted string of bits is generated, wherein for hash values of the same size, the converted strings of bits that are output are of different lengths. The frequency converter may associate each of a plurality of converted string of bits with each of a plurality of hash function values, and the plurality of converted string of bits in the frequency converter are sufficiently distinct that when read back the converted string of bits can be correlated with the appropriate hash values.

Figure 4:
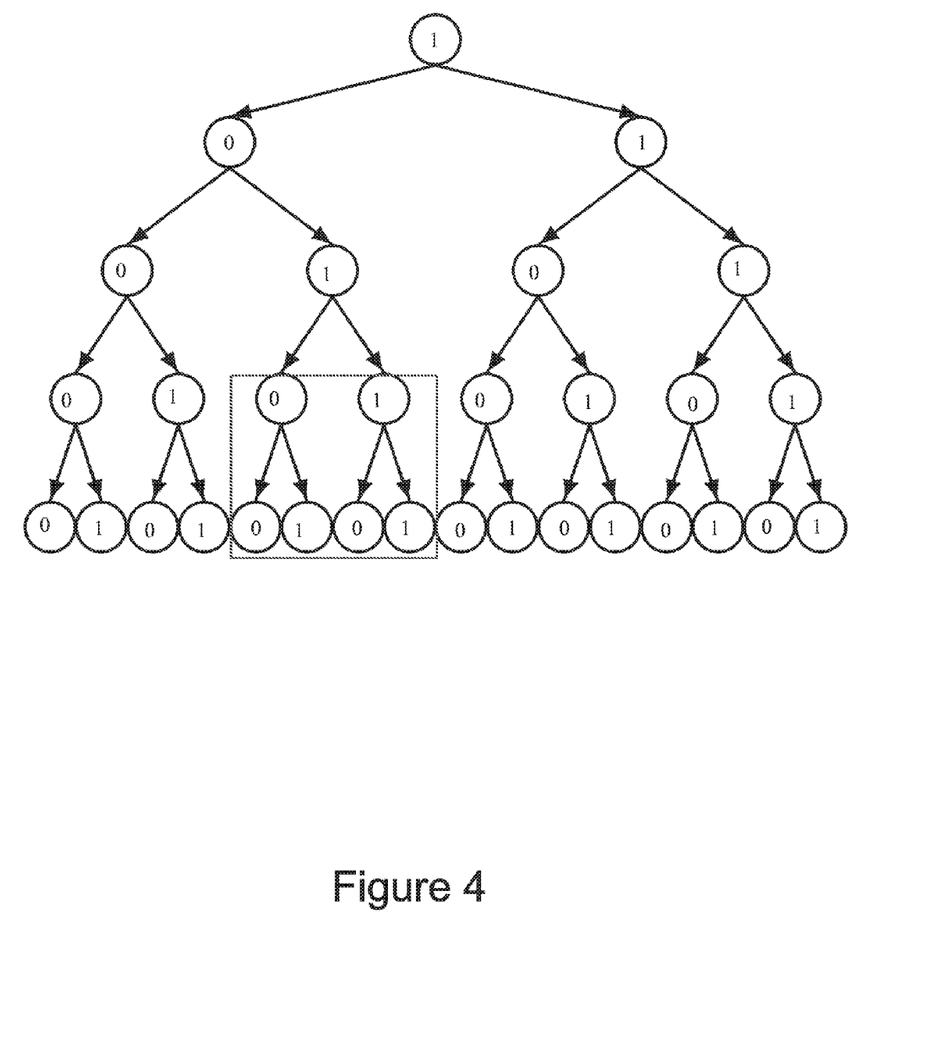
FIG. 4 is a representation of a binary tree.

To further illustrate how a frequency converter can use strings of bits of different sizes, reference may be made to FIG. 4. FIG. 4 shows a binary tree for all binary sequences that are five units long and begin with the number 1. As the tree shows, there are 16 paths to create sequences of five digits in length, beginning at the top row and moving down the tree to the bottom. However, when moving down the tree, one can move down a branch to for example the third, fourth or fifth rows. Accordingly, the method may be designed such that for one piece of data, it assigns a code that corresponds to moving partially down the tree, whereas for other pieces of data, the method assigns a code that corresponds to moving along a different branch a greater number of units. By way of a non-limiting example, for particular pieces of converted data, one may stop at the third row, e.g., generating a sequence of 101, whereas for all other pieces of data, the first three digits are not 101. Thus, the methods would never allow use of: 1010, 1011, 10100, 10101, 10110 and 10111 (which are within the box in FIG. 4). Upon retrieval of data from memory, the system would read digits until it recognizes them as unique, and upon recognition of them as unique, use the unique string as input into a program that allows for decoding. The various methods of the present invention may, during or after retrieval call for reading a minimum number of bits and after that minimum number (which corresponds to the shortest unique code), check for uniqueness by comparing to a data file or table, and if the code is not unique within the data file or table continue to extend the number of bits and check for uniqueness of the extended code after addition of each individual bit until the sequence is recognized as unique. The aforementioned example is described in terms of strings of 3, 4 or 5 bits, but those sizes were used for illustrative purposes only. In some embodiments, the shortest sequences of unique bits are 10 to 15 bits long and the longest sequences of bits are from 25 to 40 bits long.

In some embodiments, for every plurality of converted strings of bits that are of different sizes there is a first converted string of bits that is A bits long and a second converted string of bits that is B bits long, wherein A<B, and the identity of the A bits of the first converted string of bits is not the same as the identity of the first A bits of the second converted string of bits.

Methods, systems and computer program products for encoding (also referred to as converting) raw data are described in co-pending and commonly owned patent application entitled Bit Markers and Frequency Converters, U.S. Ser. No. 13/756,921, filed on Feb. 1, 2013, which is incorporated by reference in its entirety, and are further illustrated in the excerpted tables in the example section of this disclosure.

The bit marker table or frequency converter may be stored within the mediator, the manager or elsewhere. However, the bit marker table or frequency converter is able to be in communication with the mediator and/or manager. Methods and systems for communicating with files and programs that are stored locally or remotely are well known to persons of ordinary skill in the art. As Tables I, II and III (see examples) show, information may be converted and the output code can be configured to take up less space than the input because markers are used to represent groups of bits. Thus, preferably within a table, at least one, a plurality, at least 50%, at least 60%, at least 70%, at least 80%, at least 90%, or at least 95% of the markers are smaller in size than the subunits. However, there is no technological impediment to having the converted data be the same size or larger than the data received from the host or as generated from a hash function value algorithm.

Optionally, after the I/O (output from the host, input to the system) is received from a host, the method further comprises acknowledging receipt of the I/O stream to the host. The host may record the file of the I/O stream as being stored at a first storage address and the converted string of bits are stored in the non-cache recording medium at a second storage address, wherein the first storage address is not the same as the second storage address. Further, the first storage address may correspond to a first file size and the second storage address may correspond to a second file size, wherein the first file size is at least two times as large or at least four times as large as the second file size.

In some embodiments, the second storage address is stored on a mediator. Within the mediator, the second storage address may be stored in a bit field.

In some embodiments, the mediator comprises: (i) a first set of tracks, wherein the first set of tracks comprises file system information, bootability information and partition information; (ii) a second set of tracks, wherein the second set of tracks comprises a copy of the first set of tracks; (iii) a third set of tracks, wherein the third set of tracks comprises metadata other than file system information, bootability information and partition information; and (iv) a fourth set of tracks, wherein the fourth set of tracks comprises the bit field.

The aforementioned embodiments describe methods in which each fragment's unit of bits is subjected to a cryptographic hash function value algorithm prior to accessing the correlation file. However, alternatively one could check the correlation file first, and apply a cryptographic hash function value algorithm only if the fragmented units are not already in the table.

Accordingly, in some embodiments, the present invention provides a method for storing data on a non-cache recording medium comprising: (i) receiving an I/O stream of N Bytes; (ii) fragmenting the N Bytes into fragmented units of X Bytes; (iii) associating a cryptographic hash function value with each fragmented unit of X Bytes, wherein the associating comprises accessing a correlation file, wherein the correlation file correlates a stored hash function value of Y bits with each of a plurality of stored sequences of X Bytes and (a) if the sequence of fragmented X Bytes is in the correlation file, using the stored hash function value of Y bits for storage on a non-cache recording medium; and (b) if the sequence of fragmented X Bytes is not in the correlation file, then generating and storing a new hash function value of Y bits with the fragmented sequence of X Bytes in the correlation file and using the new hash function value for storage on the non-cache recording medium.

In this embodiment, after a new hash value is generated, the method may then check whether there is a conflict, i.e., whether despite there being different fragmented units, the algorithm associated the same checksum with those different fragmented units. If this is the case, then a conflicts module may cause different Z bits to be associated with each of the conflicting checksums. The number of Z bits may, for example, be 8-16 or 8 or 16.

The above described methods call for fragmenting the I/O stream of N Bytes. However, the methods could be applied by applying a cryptographic hash function value algorithm to the I/O stream and not fragmenting it. Accordingly, in some embodiments, the present invention provides a method for storing data on a non-cache recording medium comprising: (i) receiving an I/O stream of N Bytes; (ii) applying a cryptographic hash function value algorithm to each unit of N Bytes to form a generated hash function value for each unit of N Bytes; (iii) accessing a correlation file, wherein the correlation file correlates a stored hash function value of Y bits with each of a plurality of stored sequences of N Bytes and (a) if the generated hash function value for the unit of N Bytes is in the correlation file, using the stored hash function value of Y bits for storage on a non-cache recording medium; and (b) if the generated hash function value for the unit of N Bytes is not in the correlation file, then storing the generated hash function value of Y bits with the fragmented unit of N Bytes in the correlation file and using the generated hash function value for storage on the non-cache recording medium.

Alternatively, the method could comprise: (i) receiving an I/O stream of N Bytes; (ii) associating a cryptographic hash function value with each unit of N Bytes, wherein said associating comprises accessing a correlation file, wherein the correlation file correlates a stored hash function value of Y bits with each of a plurality of stored sequences of N Bytes and (a) if the sequence of N Bytes is in the correlation file using the stored hash function value of Y bits for storage on a non-cache recording medium; and (b) if the sequence of N Bytes is not in the correlation file, then generating and storing a new hash function value of Y bits with the N Bytes in the correlation file and using the new hash function value for storage on the non-cache recording medium. As with other methods, the method can be used with a conflict module. Additionally, although various methods are for illustrative purposes described as being applied to a set of N Bytes or X Bytes, a person of ordinary skill in the art will appreciate that the methods may be and preferably applied for all N Bytes or X Bytes of a file.

The various method of the present invention may be used in combination with other methods that are now known or that come to be known and that a person of ordinary skill in the art would appreciate as being of use in connection with the methods described herein.

The various methods may be controlled automatically by a manager, which may comprise one or more modules and reside on a local computer, on a network or in a cloud. The manager is configured to coordinate receipt of or to receive certain information itself and to transfer this information to a mediator, or to control receipt of the information directly by the mediator. Thus, the methods can be designed such that information from the initiator flows through the manager to mediator or that the manager only directs the flow of information to other components of the system.

In various embodiments of the present invention, the manager may apply or cause to be applied, the hash function algorithm, any conflict module if present and any conversion module if present and cause the flow of data directly to the mediator. The manager also may control storage of information through use of the mediator and retrieval and transmission of information. When storing the information, an LBA number may be identified and the data to be stored may be sent to a buffer in order to avoid or to reduce bottlenecking. Further, L1 and/or L2 cache may be used during storage.

Similarly, when retrieving data, the method may call the data from the NCM, fill a buffer, obtain the checksum values, and then recreate the fragmented units and reassemble, or if not fragmented, then directly reassemble to form information in a form that a host may receive and review. If the stored data is converted data, prior to obtaining the checksum values, the data may be decoded.

In some embodiments, a manager may control, communicate with and coordinate the activities of one or a plurality of mediators. For each mediator, the manager receives (or coordinates receipt of) a set of parameters. These parameters may comprise, consist essentially of or consist of one, two or all three of file system information, bootability information and partitioning information. The manager causes this information to be stored in a first set of tracks on the mediator, which may be referred to as reserve 1 or $R_1$. The file system will dictate how the reserve blocks are to be used. For example, when using NTFS, sectors 1-2 may be for a MBR (master boot record) and sector 3 may be for $MFT. Optionally, these tracks may be copied into a second set of tracks, which may be referred to as reserve 2 or $R_2$.

The manager may also receive metadata in addition to the parameters described in the preceding paragraph. The metadata is stored in a third set of tracks on the mediator. At the time that the manager receives the parameters and metadata, or at a later time, it may also receive one or more files for storage on a non-cache medium. Each file is received with a file name. The file name is generated by a host that transmits the file and may be defined by the host's file system. The manager, which may for example be or be a part of a SAN or NAS or combination thereof, upon receipt of the file with a file name, can automatically execute the steps described herein for storage.

The files of the I/O stream comprise, consist essentially of or consist of a plurality of digital binary signals, e.g., 0s and 1s. These digital binary signals of the I/O stream may be organized in chunklets that are defined by their length, which is an integer number greater than 1. Additionally, within a file, the chunklets have an order. Typically, for a given file, each chunklet contains the same number of bits. If any chunklet does not have that number of bits, e.g., one or more chunklets has a smaller number of bits the receiving system may add bits, e.g., zeroes, until all chunklets are the same size.

In certain methods described above, the converted data is formed from the hash values. However, it is within the scope of the present invention to encode data without first using a hash function value algorithm or prior to using it. Thus, in some embodiments, a method assigns a marker to each chunklet from a set of X markers to form a set of a plurality of markers, wherein X equals the number of different combinations of N bits within a chunklet, identical chunklets are assigned the same marker and at least one marker is smaller than the size of a chunklet. Consequently, the set of coded data comprises said plurality of markers. In other embodiments, the method assigns a marker to each subunit from a set of X markers to form a set of a plurality of markers, wherein X equals the number of different combinations of N bits within a subunit, identical subunits are assigned the same marker and at least one marker is smaller than the size of a subunit and wherein the set of coded data comprises said plurality of markers. Optionally, if a system knows (or is designed with the premise) that for a particular type of file not all combinations of N bits will be used, within the bit marker table or frequency converter there may be fewer markers than all of the theoretically possible number of markers for a given chunklet size.

During the translation process (which also may be referred to as an encoding process) the string of bits (i.e., the chunklets or subunits) that the algorithm uses as input for the bit marker table or frequency converter may be pre-processed. Each of these strings of bits may be defined by a first end and a second end, and prior to assigning a marker the method further comprises analyzing each string of bits to determine if the bit at the second end has a value of 0. If the bit at the second end has a value of 0, the method may remove the bit at the second end and all subsequent bits that have a value of 0 and form a contiguous string of bits with the bit at the second end, thereby forming a string of bits of reduced size. A benefit of the pre-processing step is that a small bit marker table or frequency converter can be used. For example, Table II could be used instead of Table I to produce the same coded data. As persons of ordinary skill in the art will recognize, this preprocessing can be accomplished by searching and removing 1s instead of zeroes from the second end.

Additionally, as persons of ordinary skill in the art will recognize, Table I and Table II assign bit markers (i.e., converted bits) in a manner that is independent of the frequency of the bits in the raw data. However, as mentioned above and explained in example 3 below, one could assign smaller markers to raw data that is expected to appear more frequently in a document type or set of documents. This strategy takes advantage of the fact that approximately 80% of all information is contained within approximately the top 20% of the most frequent subunits. In other words, the subunits that correspond to data are highly repetitive. The converted or coded bits may be stored directly or subjected to a hash function value algorithm as described above.

The systems of the present invention may be designed such that the hash function value algorithm and algorithm for conversion are either stored within the mediator, or the manager, or within other hardware and/or software that are operably coupled to the mediator or manager. Either or both the algorithms may also cause the file name to be stored in a mediator. There are no limitations as to where the mediator is physically located. However, preferably, it is configured to communicate with a host or a computer that is capable of communicating with a host that preferably is located remote from the mediator. The mediator is also configured to communicate, directly or indirectly (e.g., through the manager), with a recording medium, e.g., a non-cache medium where the coded set of data is stored, which optionally is remote from the mediator, any manager and the host. As noted above, the mediator permits a user who identifies the file name to retrieve the set of coded data from the non-cache storage medium.

In some embodiments, upon receipt of the raw data, the methods of the present invention may cause a confirmation of receipt to be automatically returned to the host. In one QoS (quality of service) protocol, a data file is received through an I/O and immediately sent to L1 cache. Upon receipt, an acknowledgement is sent from L1 cache back through the I/O. From L1 cache, the data file may be sent to L2 cache, which transmits an acknowledgement back to L1 cache. The L2 cache may also send the data file to a non-cache medium (NCM) for long term storage. The NCM may in turn send an acknowledgement back to L2 cache.

In some embodiments, the mediator may reside in or be operably coupled to a heap (dynamically allocated memory) within L1 cache. Alternatively, the mediator may reside within a card, or be part of or be operably coupled to L2 cache.

As one of ordinary skill in the art knows, the decision to place the mediator in L1 versus L2 will be impacted by factors such as the frequency of use of the stored data. Thus, L1 cache is used to store data that is used frequently by the system or an end user, while L2 caches may be used for data that is accessed somewhat frequently.

In another QoS protocol, through the I/O, a data file is received by L1 cache. The data file is transferred to both L2 cache and the NCM from L1 cache. Each of L2 cache and the NCM send acknowledgments to L1 cache. Either before or after receiving acknowledgments from one or both of L2 cache and the NCM, L1 cache sends an acknowledgement through the I/O.

In the various embodiments of the present invention, the host will understand each file to be stored at a first storage address. The first storage address may be stored by the host in a sector map and correspond to a LUN. It may also include the start and, either implicitly or explicitly, the end of the units, sectors or blocks that correspond to a file. The first storage address will correspond to where the host believes that the file is located within a storage device or storage area network. The host will use this first address to keep track of its stored documents and to retrieve them. The first storage address is a virtual address i.e., it does not correspond to where the data is actually stored.

As persons of ordinary skill in the art will recognize, methods and systems may be used in which the host generates the first storage address and sends it along to the systems of the present invention with SCSI commands and optionally associated sector or LBA numbers. The mediator may correlate the file name, what the host thinks of as the location of the file and the storage size of the file as received from the host, i.e., the raw data and any header or footer data, with a second storage address, which is the actual storage address of the data, which may be converted. Alternatively, the mediator may store only the file name, and optionally, it may not receive the first storage address for a file. As noted above, because storage addresses are based on a linear organization of data, they may implicitly or explicitly contain the size of the stored information.

Although the paragraphs above describe that the host will provide what it believes to be the first storage address, the information could be generated by another entity that either is a conduit through which the host communicates directly or indirectly with the mediator, a module within the host or operably coupled to the host, or a module within or operably coupled to the mediator and/or manager. As persons of ordinary skill in the art will recognize, the stored information that identifies a location of a data file on a storage device may be referred to as a pointer.

Because in many embodiments, the stored file will be smaller than the raw data file as received from the host, less storage space is needed for it. Thus, the data needed to recreate the file can be stored in a smaller location than the host perceives is being used and than the first storage address suggests. The actual location in which the file is stored, may be referred to as a second storage address. Thus, for each file there will be a first storage address, which is where the host believes that the file is stored, and a second storage address, which is where the coded file is actually stored.

It is possible that for a given file, which may correspond to one or more blocks, a first storage address and a second storage address are located at the same block within a storage device or one or more overlapping set of blocks. However, preferably for at least one, at least 50%, at least 60%, at least 70%, at least 80%, at least 90% or 100% of the files there is no overlap of blocks within the first storage address and the second storage address. Additionally even if the host perceives the same storage address as the mediator perceives, when data is coded the host cannot recreate the file without first decoding the data. In some embodiments, the host is unaware of the code, and thus is not capable of decoding the stored data.

As noted above, the mediator may comprise a first reserve set of tracks ($R_1$) and a second reserve set of tracks ($R_2$). In some embodiments, the second reserve set of tracks ($R_2$) is a copy of the first reserve set of tracks ($R_1$). Additionally, in some embodiments, one may use the second reserve set of tracks ($R_2$) to check for errors in the first reserve set of tracks ($R_1$).

$R_1$ may be configured to function as the central point for host initiation. Thus, the host may select the parameters to send to $R_1$. The mediator may receive this information directly from the host or indirectly through the manager. $R_2$ is preferably never exposed to the host. Thus, only the mediator itself or the manager can cause information to be stored in $R_2$. Each of $R_1$ and $R_2$ may for example contain sixteen sectors and be filled with real data such as host modifiers. By convention, numbering may start at 0. Thus, $R_1$ may for example contain sectors (or tracks) 0-15 and $R_2$ may contain sectors (or tracks) 16-31. However, the mediator may be constructed so as to allow for expansion of each of $R_1$ and $R_2$ beyond the initial size of 16 tracks.

In some embodiments, $R_1$ contains unique reserve sector information and partition information. Within the partition information, one may store the file system information.

By way of a non-limiting example and as persons of ordinary skill in the art are aware, when formatting a volume with an NFTS file system, one creates metadata files such as $MFT (Master File Table), $Bitmap, $Log File and others. This metadata contains information about all of the files and folders on an NFTS volume. The first information on an NTFS volume may be a Partition Boot Sector ($Boot metadata file), and be located at sector 0. This file may describe the basic NTFS volume information and a location of the main metadata file $MFT.

The formatting program allocates the first 16 sectors for the $Boot metadata file. The first sector is a boot sector with a bootstrap code, and the following 15 sectors are the boot sector's IPL (initial program loader).

In addition to the tracks of $R_1$ and $R_2$, the mediator may store additional metadata. This metadata may for example correspond to information that allows the execution of thin provisioning strategies, which correspond to visualization technology that allows a device to give the appearance of having more physical resources than are actually available, and it may, for example, be contained in the eight tracks after $R_2$, which would be tracks 32-39. The metadata may also provide for features such as cubelet QoS, VM and WORM.

Finally, the mediator may also comprise a bit field. The bit field contains the information that indicates where the data is physically stored within a storage medium and if the metadata is located in tracks 32-39, the sector number of the bit field begins at track 40. It is within the bit field of the mediator that correlation between the file name of the host and the location of the data is stored. Thus, it may comprise, consist essentially of or consist of a sector map. This information from the bit table component of the mediator may be used to determine the actual space saving on any device. For example, the percentage of space saved=1−[(space actually used)/(space as mapped by host)]. In some embodiments, the space saved is at least 50%, at least 60%, at least 70% or at least 80%. These savings may be per file or averaged over all files on a device.

As a matter of practice, preferably the mediator is not located on the disk or recording medium on which the coded data is stored. Additionally, preferably the mediator requires only about 0.1-0.2% of the total memory of the corresponding disk or recording medium.

In addition to providing economic value from saving of space, various embodiments of the present invention open the door for increased efficiencies when looking to protect the integrity of data. Accordingly, various embodiments of the present invention provide new and non-obvious technologies for backing-up data.

In certain embodiments, one may use two mediators to facilitate backing-up data. For example, in a first mediator one may correlate a data file that is stored in a first sector or first sector cluster on a first recording medium with a file name. As described above, the first mediator is configured to permit a user or entity that identifies the file name to retrieve the data file from the recording medium.

A data protection protocol may be executed that generates a second mediator. The second mediator will be an exact copy of the first mediator at a time T1. Thus, at T1, both the first mediator and the second mediator will point to the same sectors or sector clusters (and locations therein) on the first recording medium.

After time T1, for example at T2, the host may seek to update a file that is stored in a given location on a given sector or sector cluster. The host will not change the data stored at the first storage address. However, rather than causing the information on the sector or sector cluster to be written over, the first mediator may cause the new information to be written to a third storage address that corresponds to a location in a different sector or sector cluster and correlate the file name and the first storage address with this new storage address.

Thus, the first mediator will point to a new sector or sector cluster even though the host believes that the information is being overwritten at a particular storage address. Accordingly, the host will not need to update its address for the sector cluster.

Additionally, the second mediator will not be updated, and it will continue to correlate the file name with the first location at which the file was stored. This use of the two mediators will permit one to provide a snapshot of the data as it existed at T1, without causing the host to need to update its file system to indicate that the file as it existed both at T1 and at T2 are being stored. Thus, the snapshot locks all data files that are stored at time T1 and prevents anyone from deleting or writing over those physical files. However, if the host wishes to revise those files, it can work under the impression that it is doing so, when in fact new files are stored. This method is described in connection with sectors and sector clusters. However, it will also work with non-cache media that are not arranged in sectors or sector clusters. For example, they may be organized by LBAs in LUNs.

As suggested above, this method may be implemented by a system that comprises a first mediator, a second mediator and a non-cache storage medium. Each of the first mediator, the second mediator and the recording medium may be stored on or be formed from separate devices that comprise, consist essentially of or consist of non-transitory media. The afore-described system recites the use of different sectors of the same recording medium but could also be used by writing to different sectors of different recording media. Additionally, within the system the mediators and the recording media are operably coupled to one another and optionally to one or more computers or CPUs that store instructions to cause them to carry out their intended functions and to communicate through one or more portals over a network to one or more hosts. Still further, although this embodiment is described in connection with the use of two mediators, one could implement the system using two sections of the same mediator rather than two separate mediators.

The system may further be configured with a locking module. The locking module may prevent revision, overwriting or deletion at one or more blocks that have been written as of a certain time. The locking module may also be designed to allow for the writing of new blocks and revision of those new blocks that have not been locked. Thus, the locking module may be configured to permit a host, a user or a system administrator to select certain blocks that have been written as of a certain time or to select all blocks that have been written as of a certain time not to be overwritten.

Furthermore, there may be a selection module that by default sends all requests for retrieval of files and revision, overwriting or deletion through the first mediator. The selection module may also be configured to allow recovery of what a host may believe are older versions of one or more files as of the times at which the locking technology was applied. Optionally, access to the entire selection module may be restricted to persons who have authorization, e.g. a system administrator.

The aforementioned system for backing-up data is described in the context of two mediators. However, more than two mediators could be used to capture a history of stored files or versions of files.

In some embodiments the system may contain a SAN indexer. The SAN indexer may check what is in $R_1$ and $R_2$, and extract that information. This information can be put into a database that may readily be searched by, for example, text searching.

According to another method for backing up data, a clone of the non-cache media may be made. In this method, in a first medium, one correlates a plurality of file names with a plurality of locations of data that are stored on a non-cache storage medium. The first mediator is configured to permit a user who identifies a specific file name to retrieve a data file from the first non-cache storage medium that corresponds to the specific file name. Part or the entire specific file may be stored in a first sector or sector cluster.

One may make a copy of the plurality of data files (or all data files of a first non-cache storage medium) to a second non-cache storage medium and a second mediator. The second mediator is a copy of the first mediator at time T1 and is operably coupled to the second non-cache storage medium. At time T2, which is after T1, the system may save revisions to a data file that is stored in said first sector or sector cluster on the first non-cache storage medium. However, no changes would be made to the corresponding location on the second non-cache medium. As a user requests a file after T2, he or she would go through the first mediator and retrieve the most recent stored version of the file. However, the system administrator would have access to an earlier version, which would be stored on the second non-cache medium and could retrieve it by going through the second mediator.

This method may be implemented by a system that comprises a first mediator, a second mediator, a first non-cache storage medium and a second non-cache storage medium. Each of the first mediator, the second mediator and the first and second recording media for storing data files may be stored on separate devices that comprise, consist essentially of or consist of non-transitory media. Additionally, the first mediator correlates a file name that is derived from a host with a first cubelet of the first recording medium and the second mediator correlates the same file name with a second cubelet on the second recording medium. In some embodiments, the most recent file, which is stored in the first non-cache medium, has the same LUN that the legacy file has within the second non-cache medium.

Retrieval of the data as stored may be through processes and technologies that are now known or that come to be known and that a person of ordinary skill in the art would appreciate as being of use in connection with the present invention. Optionally, a manager coordinates storage and retrieval of files.

After the data is retrieved from a recording medium, if the data has been converted, then one translates the plurality of markers (or data that has been converted through the frequency converter) into bits that may be used to form chunklets or hash values to be converted back into the I/O stream or the fragmented units of the I/O stream. The markers may be stored such that each marker corresponds to a chunklet or each marker corresponds to a subunit and a plurality of subunits may be combined to form a chunklet. In the stored format, the markers are arranged in an order that permits recreation of bits within chunklets (or hash values) and recreation of the order of chunklets (or hash values), in a manner that allows for recreation of the desired document or file.

If the data is converted, then in order to translate the markers into chunklets, one may access a bit marker table or a frequency converter. Within the bit marker table or frequency converter, there may be a unique marker that is associated with each unique string of bits or within each unique string of bits within the file. If the table is organized in a format similar to Table II, after translation, zeroes may be added in order to have each subunit and chunklet be the same size. When decoding, one uses the bit maker table or frequency converter in the opposite way that one would use this for coding. Optionally, instead of using the same table and reversing the input and output, one could use separate tables.

After the chunklets are formed, in some embodiments, one will have an output that corresponds to binary data from which a file can be reconstituted. In other embodiments, the converted data corresponds to hash values, and the hash values must first be used to create fragmented units of the I/O stream or the I/O stream itself.

Optionally, one may associate the file with a file type. The file type will direct the recipient of the data to know which operating system should be used to open it. In some embodiments, the association with a file type is done at the initiator or client or host.

In order to illustrate the various embodiments further and to provide context, reference is made below to specific hardware that one may use, which may be combined to form a system to implement the methods of the present invention. The hardware may be configured to allow for the above described process to be automated and controlled by one or more processors.

In some embodiments, a host may generate documents and computer files in any manner at a first location. The documents will be generated by the host's operating system and organized for storage by the host's file system. The host's operating system may locally store in its memory, the file name. The present invention is not limited by the type of operating system or file system that a host uses. By way of a non-limiting example, the host may comprise a computer or set of computers within a network having one or more of the following hardware components: memory, storage, an input device, an output device, a graphic user interface, one or more communication portals and a central processing unit.

At that first location a SAP executes a protocol for storing the data that correlates to documents or files. The SAP formats the data into I/O streams or chunklets that are for example 4K in size.

The data may be sent over a SAN to a computer that has one or more modules or to a computer or set of computers that are configured to receive the data. This receiving computer may comprise one or more of the following hardware components: memory, storage, an input device, an output device, a graphic user interface, a central processing unit and one or more communication portals that are configured to permit the communication of information with one or more hosts and one or more storage devices locally and/or over a network.

Additionally, there may be a computer program product that stores an executable computer code on hardware, software or a combination of hardware and software. The computer program product may be divided into or able to communicate with one or more modules that are configured to carry out the methods of the present invention and may be stored in one or more non-transitory media.

In some embodiments, there may be a level 1 (L1) cache and a level 2 (L2) cache. In the present invention, by way of an example, the data may be sent over a SAN to a cache and the data may be sent to the cache prior to accessing a hash function algorithm, prior to consulting a bit marker table, prior to consulting a frequency converter, and prior to truncating bits, and/or after consulting a hash function algorithm, after consulting a bit marker table, after consulting a frequency converter, and after truncating bits.

Assuming that the sector size is 512B, for each chunklet that is 4K in size, the host will expect 8 sectors of storage to be used.

In another embodiment, the present invention provides a data storage and retrieval system. The system comprises a non-cache data storage medium, a mediator and a manager. Communication among these elements and optionally the initiator may be over a network that is wired, wireless or a combination thereof.

The non-cache data storage medium may for example comprise, consist essentially of or consist of one or more disks or solid state drives. When in use, the non-cache data storage medium may store files with a space savings of at least 50%, at least 60%, at least 70% or at least 80%.

The mediator may comprise, consist essentially of or consist of four sets of tracks: a first set of tracks, a second set of tracks, a third set of tracks and a fourth set of tracks. The mediator is preferably stored on a non-transitory medium and is located remotely from the non-cache data storage medium. Thus, the mediator and the non-cache data storage medium are preferably not part of the same device.

The system may also contain a manager. The manager may provide the control of the receipt, processing storage and retrieval and transmission of data through the mediator. Thus, preferably, it is operably coupled to the host and the mediator and optionally operably coupled to the non-cache data storage medium. Furthermore, in some embodiments it is located remotely from each of the mediator, the non-cache medium and the host.

The manager may be configured to carry out one or more of the following features: (a) to store data comprising one or more of file system information, bootability information and partition information in the first set of tracks; (b) to store metadata in the third set of tracks; (c) to store one or more files on the non-cache medium, wherein the one or more files are stored on the non-cache medium without any of file system information, bootability information or partition information (thus in some embodiments, only raw data is on the non-cache medium); (d) to store in the fourth set of tracks the location of each file in the non-cache medium; and (e) to store a correlation of the location of each file in the non-cache medium with a host name for a file. Preferably, the correlation of the location of each file in the non-cache medium with a host name for a file is stored in the fourth set of tracks, which corresponds to a bit field. Additionally, the manager may comprise or be operably coupled to a computer program product that contains executable instructions that are capable of executing one or more of the methods of the present invention.

Figure 1:
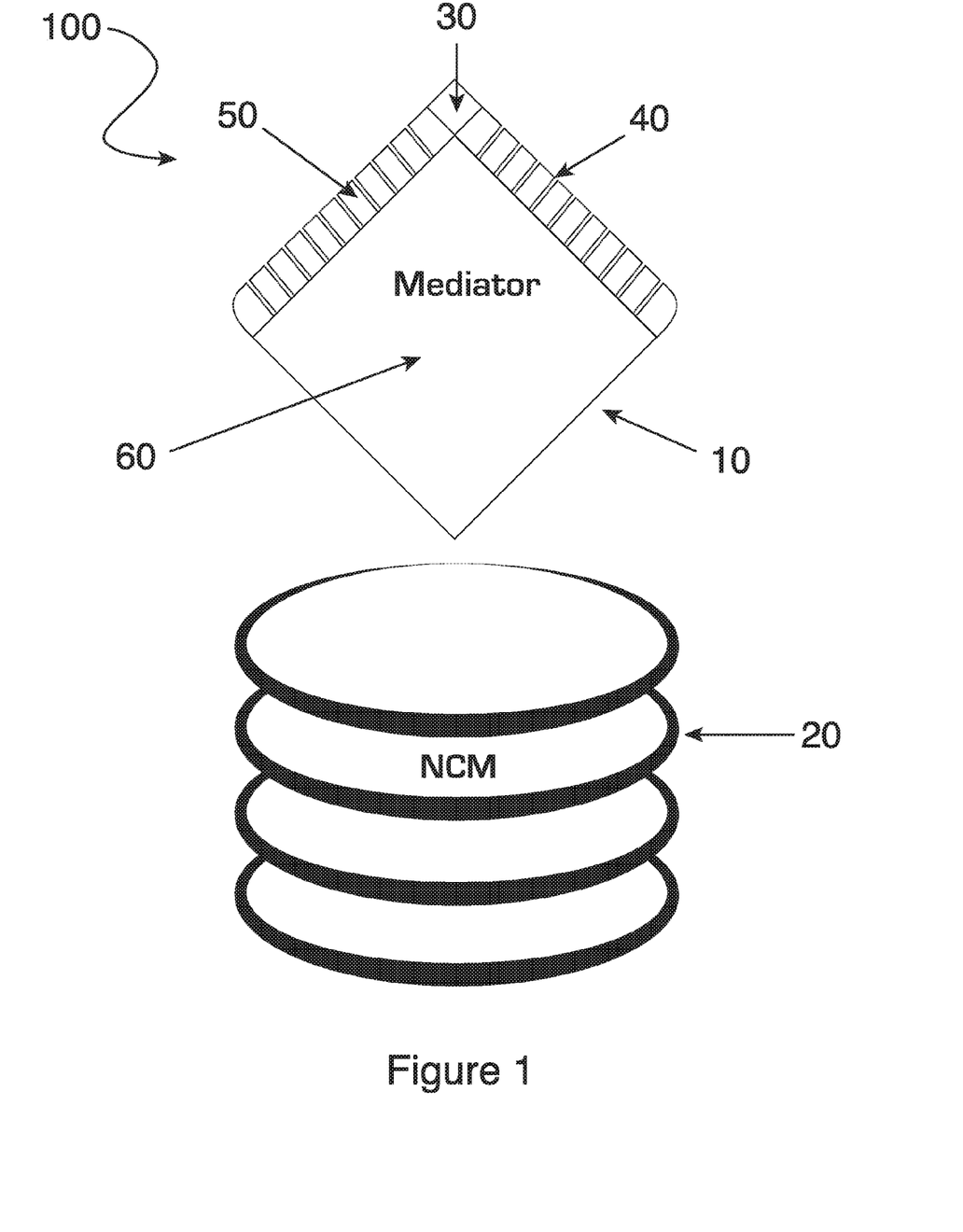
FIG. 1 is a representation of a mediator and non-cache medium (NCM).

For purposes of further illustration, reference may be made to the figures. FIG. 1 shows a system 100 with a mediator 10 that contains $R_1$ 40 and $R_2$ 50, as well as a space for a bit field 60 and metadata files 30. The representation of the mediator is for illustrative purposes only and places no limitations on the structure of the mediator or organization within it. Also shown is a non-cache medium (NCM) 20. The non-cache medium is shown in the proximity of the mediator, but they are separate structures.

Figure 2:
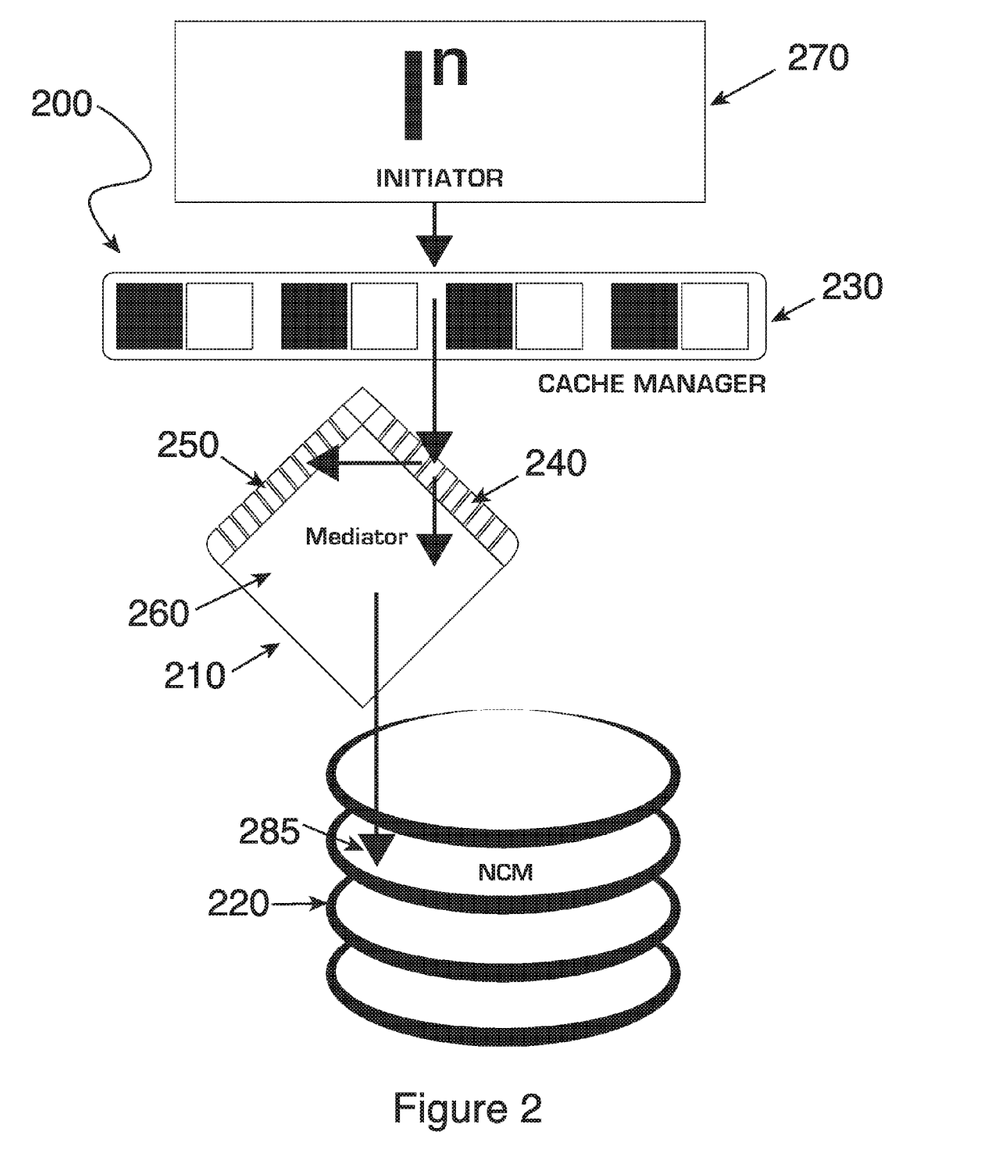
FIG. 2 is a representation of a system for storing information using a mediator.

FIG. 2 shows another system 200. In this system, the initiator (I″) 270 transmits chunklets to a cache manager 230, which optionally arranges for coding of data files and transmits them to the mediator 210. Examples of hosts include but are not limited to computers or computer networks that run Microsoft Windows Server and Desktop, Apple OS X, Linux RHEL and SUSE Oracle Solaris, IBM AIX, HP UX and VM ESX and ESXi. The information, corresponding to data files, is initially sent to $R_1$ 240, which previously was populated with parameters that the initiator defined. The mediator may itself translate the information through use of a bit marker table or a frequency converter (not shown) or it may communicate with a remote encoder (which also may be referred to as a remote converter and is not shown), and the mediator will store within $R_1$ as well as within $R_2$ 250 copies of a file name that is received from the host. After the data has been converted, and a smaller size file has been created, within a sector map of the bit field 260, is recorded a location that the file will be stored in the disk 220. The coded data will be stored at location 285. Prior to or instead of coding data, a hash value algorithm may be accessed and the checksums may be used for storage or conversion.

Figure 3:
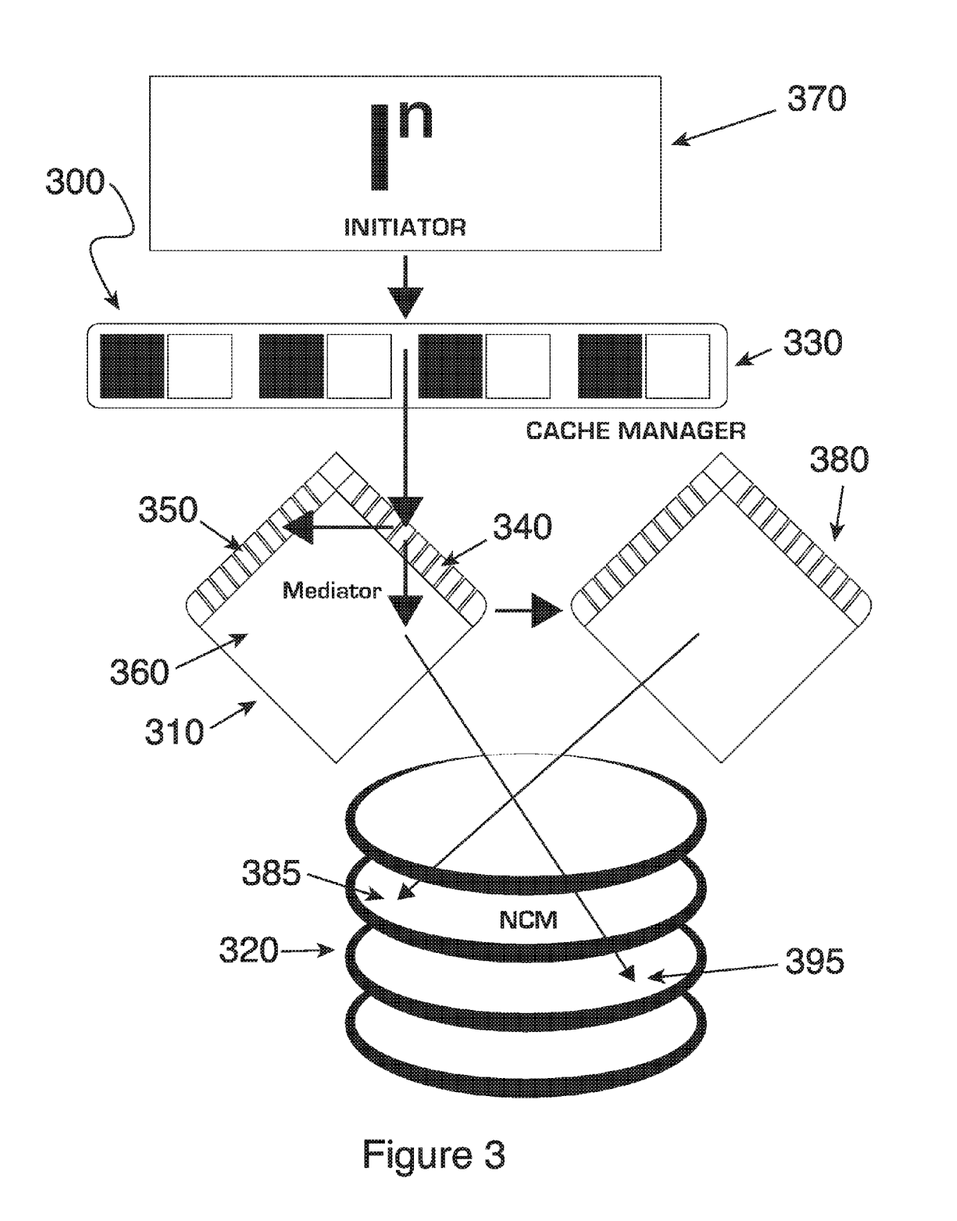
FIG. 3 is a representation of a system for using two mediators to back up information that is stored.

FIG. 3 shows another system 300 that is a variation of the embodiment of the system of FIG. 2 and that provides for back-up of storage. In this system the initiator 370 transmits chunklets to the cache manager 330, which forwards information to the mediator 310 that contains data to revise the same file that was sent for FIG. 2. Either prior to receipt of the revised file or after receipt of it, but before storage of it in the non-cache media, a second mediator 380 is created from the first mediator 310. The second mediator is an exact copy of the first mediator at the time that it was created and for the file name, at that time, points to the same sector (or sector cluster) 385 within the non-cache medium 320.

The first revised file is received at $R_1$ 340 of the first mediator. The first mediator will again either translate the information through use of a bit marker table or a frequency converter (not shown) or communicate with a remote encoder. The mediator will continue to store within $R_1$ as well as within $R_2$ 350 copies of the file name that is received from the host. After the data has been converted, and a smaller size file has been created, within a sector map of the bit field 360 of the first mediator, is recorded a location that the file will be stored in the disk 320. However, the revised file will be stored in a different sector 395. Thus, the changes to the first mediator will not be made to the second mediator.

The host is by default in communication with the first mediator. Thus, when it wants to recall the file from storage, the first mediator will call back the data from sector 395. Should the host or a system administrator wish to obtain a previous version of the data, it could submit the file name to the second mediator, which would look to sector 385.

According to any of the methods of the present invention, any data that is stored in a converted form is capable of being retrieved and decoded before returning it to a host. Through the use of one or more algorithms that permit the retrieval of the converted data, the accessing of the reference table or frequency converter described above and the conversion back into a uniform string of bits and chunklets, files can be recreated for hosts. By way of a non-limiting example, the data may be converted and stored in a format that contains an indication where one marker ends e.g., use of unique strings of bits.

As persons of ordinary skill in the art will recognize, certain embodiments of the present invention are described in connection with one or two non-cache media. However, an initiator may be associated with a plurality of mediators and a plurality of non-cache media.

Any of the features of the various embodiments described in this specification can be used in conjunction with features described in connection with any other embodiments disclosed unless otherwise specified. Thus, features described in connection with the various or specific embodiments are not to be construed as not suitable in connection with other embodiments disclosed herein unless such exclusivity is explicitly stated or implicit from context.

EXAMPLES

Example 1

Bit Marker Table (Prophetic)

Within a reference locator table each unique marker is identified as corresponding to unique strings of bits. The table may be stored in any format that is commonly known or that comes to be known for storing tables and that permits a computer algorithm to obtain an output that is assigned to each input.

Table I below provides an example of excerpts from a bit marker table where the subunits are 8 bits long.

TABLE I

| Bit Marker (as stored) | Subunit = 8 bits (input) |
| --- | --- |
| 0101 | 00000001 |
| 1011 | 00000010 |
| 1100 | 00000011 |
| 1000 | 00000100 |
| 1010 | 00000101 |
| 11111101 | 11111101 |

By way of example and using the subunits identified in Table I, if the input were 00000101 00000100 00000101 00000101 00000001, the output would be: 1010 1000 1010 1010 0101. When the bit marker output is smaller than the subunit input, it will take up less space on a storage medium, and thereby conserve both storage space and the time necessary to store the bits.

As a person of ordinary skill in the art will recognize, in a given bit marker table such as that excerpted to produce Table I, if all combination of bits are to be used there will need to be $2^N$ entries, wherein N corresponds to the number of bits within a subunit. When there are 8 bits, there are 256 entries needed. When there are 16 bits in a subunit one needs $2^{16}$ entries, which equals 65,536 entries. When there are 32 bits in a subunit, one needs $2^{32}$ entries, which equals 4,294,967,296 entries. If one knows that certain strings of bits will not be used in files, then the table may allocate markers starting with the smallest ones.

Example 2

Bit Marker Table for Pre-Processed Subunits
(Prophetic)

Because as the subunit size gets larger the table becomes more cumbersome, in some embodiments, the table may be configured such that all zeroes from one end of the subunit column are missing and prior to accessing the table, all zeroes from that end of each subunit are removed. Thus, rather than a table from which Table I is excerpted, a table from which Table II is excerpted could be configured.

TABLE II

| Bit Marker (output) | Pre-processed Subunit |
|---|---|
| 0101 | 00000001 |
| 1011 | 0000001 |
| 1100 | 00000011 |
| 1000 | 000001 |
| 1010 | 00000101 |
| 11111101 | 11111101 |

As one can see, in the second and fourth lines, after the subunits were pre-processed, they had fewer than eight bits. However, the actual subunits in the raw data received from the host all had eight bits. Because the system in which the methods are implemented can be designed to understand that the absence of a digit implies a zero and all absences of digits are at the same end of any truncated subunits, one can use a table that takes up less space and that retains the ability to assign unique markers to unique subunits. Thus, the methods permit the system to interpret 00000001 (seven zeroes and a one) and 0000001 (six zeroes and a one) as different.

In order to implement this method, one may deem each subunit (or each chunklet if subunits are not used) to have a first end and a second end. The first end can be either the right side of the string of bits or the left side, and the second end would be the opposite side. For purposes of illustration, one may think of the first end as being the leftmost digit and the second end as being the rightmost digit. Under this method one then analyzes one or more bits within each subunit of each chunklet to determine if the bit at the second end has a value 0. This step may be referred to as preprocessing and the subunits after they are preprocessed appear in the right column of Table II. If the bit at the second end has a value 0, the method may remove the bit at the second end and all bits that have the value 0 and form a contiguous string of bits with that bit, thereby forming a revised subunit (pre-processed subunit in the table) for any subunit that originally had a 0 at the second end.

One may use a computer algorithm that reviews each subunit to determine whether at the second end there is a 0 and if so removes the 0 to form the pre-processed subunit, which also may be referred to as a revised subunit with a revised second end at a position that was adjacent to the second end of the subunit. Next, the algorithm reviews the revised subunit to determine whether at its now revised second end there is a 0 and if so removing the 0 to form a further revised second end. In this method, the revised second end would be the location that was previously adjacent to the bit at the second end. Any further revised second end would have been two or more places away from the second end of the subunit. Thus, the term "revised" means a shortened or truncated second end. The algorithm may repeat this method for the revised subunit until a shortened chunklet is generated that has a 1 at its second end.

Example 3

Frequency Exchange (Prophetic)

Based on empirical analysis, one can determine the frequency of each subunit within a type of document or a set of documents received from a particular host or from within a set of documents that have been received within a given timeframe, e.g., the past year or past two years. With this information, rather than look to a table as illustrated in Table I or Table II in which the subunits are organized in numerical order, one could look to a frequency converter in which the smaller bit markers are associated with subunits that are predicted most likely to appear within a file, within a type of document or within a set of documents as received from a particular host. Thus, within the frequency converter, the markers are a plurality of different sizes and markers of a smaller size are correlated with higher frequency subunits.

TABLE III

| Frequency Converter | | |
|---|---|---|
| Bit Marker (output) | Frequency | Subunit = 8 bits (input) |
| 0101 | 16% | 00000001 |
| 1000 | 15% | 00000010 |
| 11011 | 10% | 00000011 |
| 10011101 | 0.00001% | 00000100 |
| 10111110 | 0.00001% | 00000101 |
| 1100 | 15% | 11111101 |

Table III is an example of an excerpt from a frequency converter that uses the same subunits as Table I. However, one will note that the bit markers are not assigned in sequence, and instead larger bit markers are assigned to lower frequency subunits. As the table illustrates, the marker that is assigned to subunit 00000011 is twenty five percent larger than that assigned to subunit 00000001, and for subunit 11111101, despite being of high numerical value, it receives a smaller bit marker because it appears more frequently in the types of files received from the particular host. Thus, if one used Table I and the subunit 11111101 appears in 10,000 places, it would correspond to 111,111, 010,000 bits. However, if one used Table III, only 11,000, 000 bits would need to be used for storage purposes for the same information. Although not shown in this method, the subunits could be preprocessed to remove zeroes from one end or the other, and the table could be designed to contain the correlating truncated subunits.

As noted above, frequency converters can be generated based on analyses of a set of files that are deemed to be representative of data that is likely to be received from one or more hosts. In some embodiments, the algorithm that processes the information could perform its own quality control and compare the actual frequencies of subunits for documents from a given time period with those on which the allocation of marker in the frequency converter are based. Using statistical analyses it may then determine if for future uses a new table should be created that reallocates how the markers are associated with the subunits. As a person of ordinary skill in the art will recognize, Table III is a simplified excerpt of a frequency converter. However, in practice one may choose a hexadecimal system in order to obtain the correlations. Additionally, the recitation of the frequencies on which the table is based is included for the convenience of the reader, and they need not be included in the table as accessed by the various embodiments of the present invention.

Example 4

Allocation of Space in a Mediator (Prophetic)

In a hypothetical recording medium that is 1 MB in size, a person of ordinary skill in the art may map the sectors as follows:

The 1 MB recording medium has 1,024,000 Bytes, which corresponds to 250 sectors. (1,024,000/4096=250). The geometry of the recording medium may be summarized as follows: Volume=(c*h*spt*ss), wherein
- c (number of cylinder)=7;
- h (number of heads)=255;
- spt (sectors per track)=63; and
- ss (sector size in bytes)=4096.

Within the mediator, the sectors may be allocated as follows:

TABLE IV

| Address | Actual Non-cache-media LBA |
|---------|----------------------------|
| 0-15    | mediator <<Reserved 1>> "Boot Sector 0" +15 |
| 16-31   | mediator location <<Reserved 2>> Sys_Internal Only |
| 32-35   | mediator_Metadata |
| 36      | Map Data "LBA-nnnnnnnnnnnnn" |
| 37      | Map Data "LBA-nnnnnnnnnnnnn" |
| ...     | Map Data "LBA-nnnnnnnnnnnnn" |
| 250     | Map Data "LBA-nnnnnnnnnnnnn" |

Example 5

Space Saving

A system of the present invention received 42.5 million blocks of data in I/O streams of 4096 Bytes. It applied the MD5 hash algorithm to generate 7.8 million blocks of hash value that corresponded to the 42.5 million blocks in the I/O stream.

This translated into use of only 18.5% of the space that would have been needed to store the original 42.5 million blocks. A conflict module was applied, and it verified that no conflicts existed, i.e., no duplication of hash values, were generated for different blocks.

I claim:
1. A method for storing data on a non-cache recording medium comprising:
   i. receiving an I/O stream of N Bytes;
   ii. fragmenting the N Bytes into fragmented units of X Bytes;
   iii. applying a cryptographic hash function to each fragmented unit of X Bytes to form a generated hash function value for each fragmented unit of X Bytes;
   iv. encoding each hash function value for storage through use of a bit marker table to generate a bit marker for each hash function value for storage and storing each bit marker in the non-cache recording medium, wherein the encoding further uses a frequency of occurrence converter, wherein for each hash function value for storage, a converted string of bits is generated, wherein for at least two different strings of Y bits, the converted strings of bits that are output are of different lengths;
   v. accessing a correlation file, wherein the correlation file associates a stored hash function value of Y bits with each of a plurality of stored sequences of X Bytes and
      (a) if the generated hash function value for a fragmented unit of X Bytes is in the correlation file, using the stored hash function value of Y bits for storage on a non-cache recording medium; and
      (b) if the generated hash function value for the fragmented unit of X Bytes is not in the correlation file, then storing the generated hash function value of Y bits with the fragmented unit of X Bytes in the correlation file and using the generated hash function value for storage on the non-cache recording medium.

2. The method according to claim 1, wherein in (iii) the cryptographic hash function is the MD5 Message-Digest Algorithm.

3. The method according to claim 1 further comprising storing a plurality of hash function values on the non-cache recording medium.

4. The method according to claim 1, wherein for every plurality of converted strings of bits that are of different sizes there is a first converted string of bits that is A bits long and a second converted string of bits that is B bits long, wherein A<B, and the identity of the A bits of the first converted string of bits is not the same as the identity of the first A bits of the second converted string of bits.

5. The method according to claim 1, wherein the I/O stream is received from a host and said method further comprises acknowledging receipt of the I/O stream to the host.

6. The method according to claim 5, wherein the host records the I/O stream as being stored at a first storage address and the converted string of bits are stored in the non-cache recording medium at a second storage address, wherein the first storage address is not the same as the second storage address.

7. The method according to claim 6, wherein the first storage address corresponds to a first file size and the second storage address corresponds to a second file size, wherein the first file size is at least four times as large as the second file size.

8. The method according to claim 6, further comprising storing the second storage address on a mediator, wherein the mediator is a nontransitory storage medium.

9. The method according to claim 8, wherein the second storage address is stored in a bit field.

10. The method according to claim 9, wherein the mediator comprises:
   i. a first set of tracks, wherein the first set of tracks comprise file system information, bootability information and partition information;
   ii. a second set of tracks, wherein the second set of tracks comprise a copy of the first set of tracks;

iii. a third set of tracks, wherein the third set of tracks comprises metadata other than file system information, bootability information and partition information; and iv. a fourth set of tracks, wherein the fourth set of tracks comprise the bit field.

11. The method according to claim 8, wherein the mediator is not located on a storage medium on which the bit markers are stored.

12. A method for storing data on a non-cache recording medium comprising:
  i. receiving an I/O stream of N Bytes;
  ii. fragmenting the N Bytes into fragmented units of X Bytes;
  iii. associating a cryptographic hash function value with each fragmented unit of X Bytes, wherein said associating comprises accessing a correlation file, wherein the correlation file associates a stored hash function value of Y bits with each of a plurality of stored sequences of X Bytes and
    (a) if the sequence of fragmented unit of X Bytes is in the correlation file using the stored hash function value of Y bits for storage on a non-cache recording medium; and
    (b) if the sequence of fragmented unit of X Bytes is not in the correlation file, then storing a new hash function value of Y bits with the fragmented unit of X Bytes in the correlation file and using the new hash function value of Y bits for storage on the non-cache recording medium; and
  wherein the stored hash function value is encoded using a frequency of occurrence converter, wherein for each hash function value for storage, a converted string of bits is generated, wherein for at least two different strings of Y bits, the converted strings of bits that are output are of different lengths.

13. A method for storing data on a non-cache recording medium comprising:
  i. receiving an I/O stream of N Bytes;
  ii. applying a cryptographic hash function value algorithm to each unit of N Bytes to form a generated hash function value for each unit of N Bytes;
  iii. accessing a correlation file, wherein the correlation file associates a stored hash function value of Y bits with each of a plurality of stored sequences of N Bytes and
    (a) if the generated hash function value for the unit of N Bytes is in the correlation file, using the stored hash function value of Y bits for storage on a non-cache recording medium; and
    (b) if the generated hash function value for the unit of N Bytes is not in the correlation file, then storing the generated hash function value of Y bits with the unit of N Bytes in the correlation file and using the generated hash function value for storage on the non-cache recording medium; and
  wherein the stored hash function value is encoded using a frequency of occurrence converter, wherein for each hash function value for storage, a converted string of bits is generated, wherein for at least two different strings of Y bits, the converted strings of bits that are output are of different lengths.

* * * * *

UNITED STATES PATENT AND TRADEMARK OFFICE
CERTIFICATE OF CORRECTION

PATENT NO.        : 9,584,312 B2
APPLICATION NO.   : 15/286331
DATED             : February 28, 2017
INVENTOR(S)       : Ignomirello It is certified that error appears in the above-identified patent and that said Letters Patent is hereby corrected as shown below:

On the Title Page

Item (56), Column 2, under "Other Publications", Line 2, delete "p." and insert -- pp. --, therefor.

On Page 2, Item (56), Column 1, under "U.S. Patent Documents", Line 1, after "Domyo" insert -- et al. --.

On Page 2, Item (56), Column 1, under "U.S. Patent Documents", Line 8, after "Serret-Avila" insert -- et al. --.

On Page 2, Item (56), Column 1, under "U.S. Patent Documents", Line 12, after "Karasudani" insert -- et al. --.

On Page 2, Item (56), Column 1, under "U.S. Patent Documents", Line 17, delete "3,009,069 A1 8/2011 Chen et al.".

On Page 2, Item (56), Column 1, under "U.S. Patent Documents", Line 36, after "17/30091" insert -- 1/1 --.

On Page 2, Item (56), Column 2, under "Other Publications", Line 16, delete "USNIX" and insert -- USENIX --, therefor.

In the Specification

In Column 3, Line 47, delete "use" and insert -- user --, therefor.

In the Claims

In Column 26, in Claim 3, Line 31, after "claim 1" insert -- , --.

Signed and Sealed this
Thirtieth Day of May, 2017

Michelle K. Lee
*Director of the United States Patent and Trademark Office*